United States Patent [19]

Ishikawa et al.

[11] Patent Number: 5,774,462

[45] Date of Patent: Jun. 30, 1998

[54] UNIQUE WORD RECOGNITION SYSTEM

[75] Inventors: Hiroyasu Ishikawa; Hideo Kobayashi, both of Saitama, Japan

[73] Assignee: Kokusai Denshin Denwa Co., Ltd., Tokyo, Japan

[21] Appl. No.: 907,777

[22] Filed: Aug. 11, 1997

Related U.S. Application Data

[63] Continuation of Ser. No. 393,901, Feb. 24, 1995, abandoned.

[30] Foreign Application Priority Data

Feb. 28, 1994 [JP] Japan .................................. 6-052530

[51] Int. Cl.[6] ........................................................ H04J 3/06
[52] U.S. Cl. ........................... 370/350; 370/512; 370/514; 375/368
[58] Field of Search ........................... 370/100.1, 104.1, 370/105.1, 105.2, 105.3, 105.4, 106, 108, 350, 509, 510, 512, 514; 375/365, 366, 368

[56] References Cited

U.S. PATENT DOCUMENTS 4,802,192  1/1989  Eto et al. .................................. 375/368
5,014,272  5/1991  Yoshida .................................... 370/106
5,539,751  7/1996  Sabel ...................................... 370/105.4
5,550,833  8/1996  Fujisawa .................................. 370/514

FOREIGN PATENT DOCUMENTS

0 269 974 A2  6/1988  European Pat. Off. ........... H04J 3/06
2 092 414     8/1982  United Kingdom .............. H04J 3/06

Primary Examiner—Hassan Kizou
Attorney, Agent, or Firm—Nikaido, Marmelstein Murray & Oram LLP

[57] ABSTRACT

In a time division multiplex (TDM) signal in which a symbol is sent one by one periodically, a unique word in the TDM signal is recognized quickly in a receiving station. A receive station has essentially N number of correlators each having a specific unique word pattern. A unique word pattern in each correlator is obtained by shifting by predetermined symbols cyclically from a reference unique word pattern. Each correlator provides a correlation value between a received TDM signal which includes a unique word and a unique word pattern defined in the correlator. Among outputs of N number of correlation values, which exceed a predetermined threshold value, the correlator which provides the maximum correlation value is selected, and the receive timing of the unique word is determined by the correlator thus selected.

7 Claims, 7 Drawing Sheets

UNIQUE WORD RECOGNITION SYSTEM

This application is a continuation of application Ser. No. 08/393,901 filed Feb. 24, 1995, now abandoned.

BACKGROUND OF THE INVENTION

The present invention relates to a unique word recognition system in a radio communication system which includes a digital fixed radio communication system, a digital mobile radio communication system, a digital fixed satellite communication system, and a digital mobile satellite communication system, in which a downlink from a master station to a slave station (or a user terminal, or a user station) is carried out through a TDM signal (time division multiplex), and a frame synchronization in a slave station is carried out by using a unique word included in a frame.

In a digital radio communication system in which a downward circuit for a control signal and an information signal from a master station to a slave station is carried out through TDM signal, a master station broadcasts periodically a unique word (UW) which has a known bit pattern of 0, and 1 in the TDM signal so that a slave station establishes a frame synchronization with a frame signal from the master station. A slave station receives that TDM signal from the master station, and recognizes a frame timing of a TDM signal from the master station by measuring a peak timing of an output of a UW correlation receiver in the slave station so that a TDM frame synchronization between a master station and a slave station is established.

In a current commercial Inmalsat Standard C system, a network coordination station (NCS) and a land earth station (LES) send a slave station a unique word (UW) with a repetition period of a TDM frame so that a TDM control channel signal is synchronized in a slave station.

Figure 2:
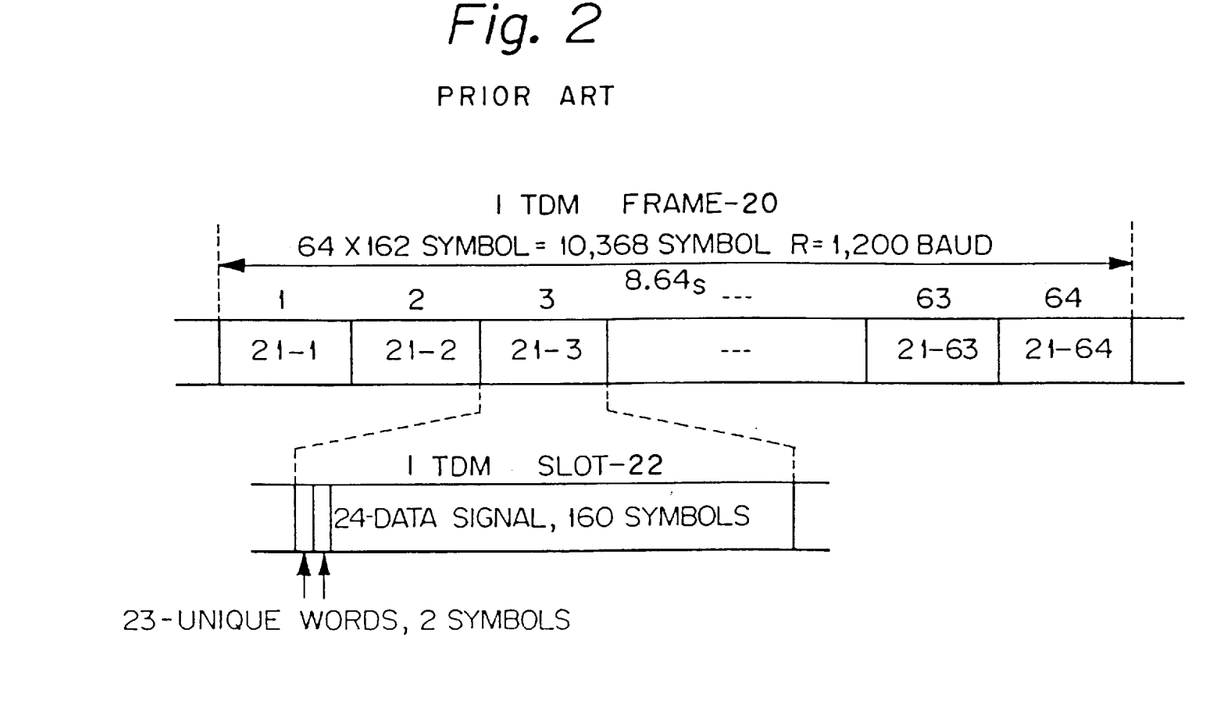
FIG. 2 shows a frame format of a TDM frame in the Inmalsat Standard C system.

FIG. 2 shows a frame format of the control channel in which the transmission rate is 1200 symbols/second).

In FIG. 2, a TDM frame 20 has 64 TDM slots 22 (21-1 through 21-64) each having 162 symbols, and a frame is transmitted in 8.64 (=162×64/1200) second, when the transmission rate is 1200 symbols/second. In each slot, the first two symbols are assigned to interleaved unique word 23 in double, and a data signal 24 is assigned the rest of 160 symbols. Since a unique word 23 is interleaved to are slots, and each slot has only a part of the information of a unique word, a whole unique word is recognized when a whole TDM frame has been received. A TDM frame 20 is broadcast repetitively, and a receiver in a mobile earth station (MES) receives the TDM frame repetitively, so that a frame timing of a TDM signal is detected and the synchronization between a master station and a slave station (mobile earth station; MES) is established.

Figure 3:
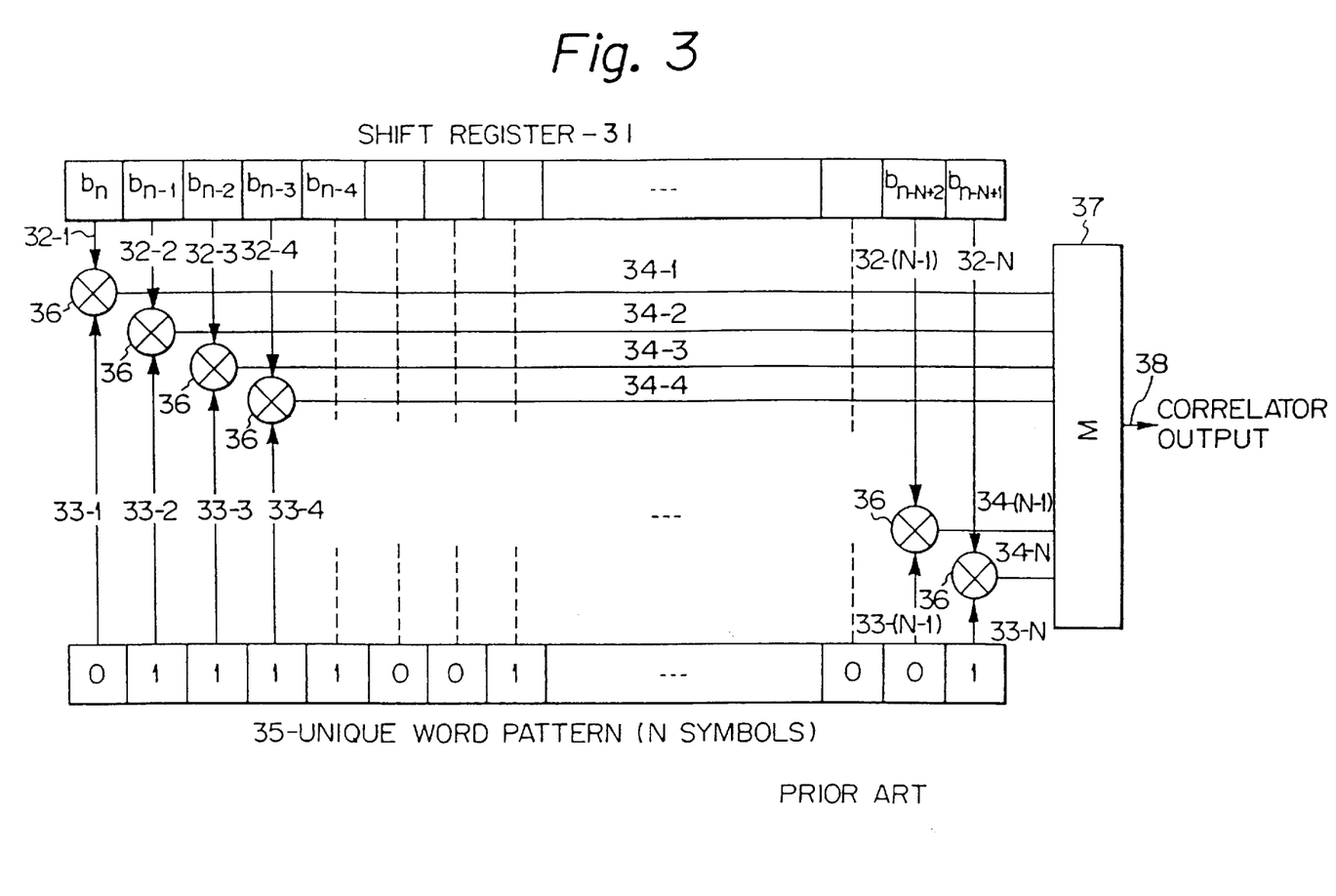
FIG. 3 is a block diagram of a prior unique word correlator.

FIG. 3 shows a prior correlation receiver for recognizing a unique word, in which a hard recognition is shown for the sake of simplicity of explanation.

In FIG. 3, detected signals $b_n$ (32-1) through $b_{n-N+1}$ (32-N) are applied into a shift register 31 which has a bit length equal to a symbol length N in a unique word correlator. The products 34-1 through 34-N are obtained for the received signal ($b_n$ through $b_{n-N+1}$) and the UW symbols (33-1 through 33-N) of the unique word pattern 35, and the sum 37 of the products are obtained. When received bit signals 32-1 through 32-N coincide with a UW pattern 35, an output 38 of the UW correlator provides the maximum value N (N is a number of bits of a unique word). When an input to a correlator is not a unique word, the average of an output of the correlator is N/2.

The following equation is satisfied, where E is threshold level for recognizing a unique word.

$$E = N - Ne \qquad (1)$$

where Ne is an allowable number of error bits, and $0 \leq Ne < N/2$ is satisfied. If the value Ne is small in the equation (1), the possibility of error to in recognizing a unique word when the received signal is not a unique word decreases, but the possibility of error in missing a unique word increases. On the contrary, if the value Ne is large, the possibility of the former increases, but the possibility of the latter decreases. Therefore, the value Ne must be optimum so that the total of the possibility of the errors is the minimum.

Figure 4:
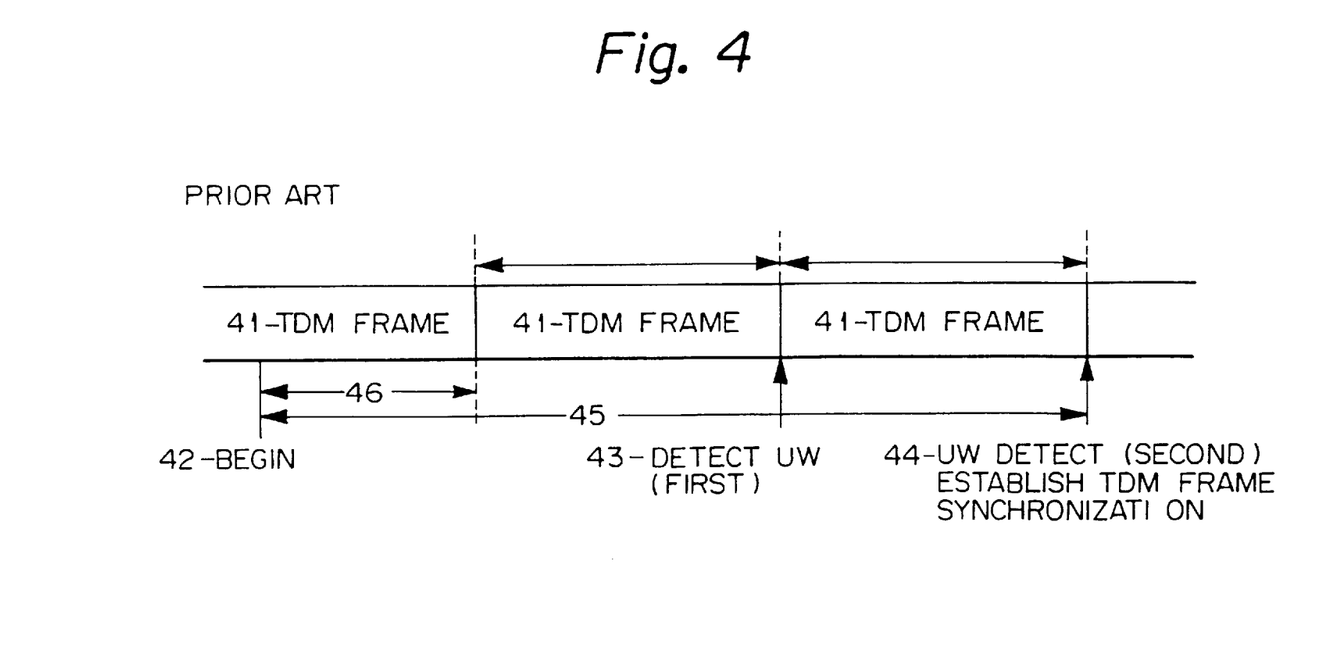
FIG. 4 shows explanation to establish synchronization in a prior art.

In a prior UW correlator in a digital radio communication system, a UW pattern is fixed in a memory, and therefore, only when a whole TDM frame 41 from a head of the frame to the end of the frame is received, an output of the UW correlator provides the maximum value to recognize a frame timing. If a frame is received from a non-beginning point of a TDM frame as shown at 42 in FIG. 4, the time 46 is wasted until the beginning point of the next frame. Further, usually, at least two frames (43,44) of TDM signals must be received, since there is a possibility of an error in receiving a frame. Therefore, in the Inmalsat Standard C system, it takes 25.92 second (=8.64×3) to recognize a frame timing after a mobile earth station begins to receive a TDM signal from a network coordination station, and/or a land earth station. Actually, the Inmalsat Standard C system specification determines that the time to establish synchronization must be less than 25 seconds (with error possibility of 1%). That specification is determined considering the restriction of the prior correlator. The similar analysis is possible even when a soft decision UW correlation receiver is used.

The problem mentioned above is not serious to such a system in which a slave station always receives a signal from a master station like a fixed station, a semi-fixed station which may use commercial power supply, a boat station, and/or a vehicle station, even if it takes some time to receive a TDM signal when a slave station begins to operate.

However, when a slave station is a handheld type portable station, it will be used in a terminal originated use, in which a slave station is switched on to access to a master station only when a user of a slave station originates a call, because of the small capacity of a battery installed in the slave station. In that use, if it takes a long time to establish synchronization when a slave station is switched on, it is very inconvenient to a user of a slave station. For instance, in the current Inmalsat Standard C system, it takes 25 seconds to establish synchronization with a network coordinate station when a slave station is switched on, and further it takes another 25 seconds to establish synchronization with a land earth station when a communication channel is given by the network coordinate station, therefore, it takes almost one minute to begin the communication.

Further, in a terminal originated use of a slave station, the amount of information to be sent from a slave station is considered to be small, and it would take only several seconds to send data from a slave station and receive message from a master station. In that case, the efficiency of communication would be very low, since a slave station is switched on every time a message is to be sent, it takes some time to establish synchronization with a master station, and it takes only a short time for actual communication.

The above problem comes from terminal originated use of a slave station, different from a conventional use in a fixed station, a semi-fixed station which uses commercial power source, a boat station, and/or a vehicle station.

SUMMARY OF THE INVENTION

It is an object, therefore, of the present invention to overcome the disadvantages and limitations of a prior unique word recognition system by providing a new and improved unique word recognition system.

It is also an object of the present invention to provide a unique word recognition system which considerably shortens synchronization establish time in a radio communication system in which a master station broadcasts a TDM signal to a plurality of slave stations, and each slave station establishes synchronization with the master station through recognition of a unique word included in the TDM signal.

The above and other objects are attained by a unique word recognition system in a radio communication system including a plurality of slave stations and a master station for communication with the slave stations. The master station broadcasts a control signal to the slave stations through a time division multiplex (TDM) signal through downward circuits from the master station to the slave stations. The time division multiplex signal has a frame which has a plurality of slots, each having a plurality of binary symbols. The frame includes a unique word which is interleaved in the slots so that a part of said unique word is included in each slot. Each slave station receiving the control signal from the master station is synchronized with the TDM signal, and initiates communication between the slave station and the master station based upon the control signal. Each slave station has a group of unique word correlators each having a specific unique word pattern, and each unique word correlator defines TDM frame timing for frame synchronization between a master station and a slave station. A unique word pattern in each unique word correlator is obtained by shifting a reference unique word pattern by predetermined symbols cyclically. The number of unique word correlators in each slave station is the same as the number of symbols in a unique word. Each of the unique word correlators provides a correlation output value between a received frame signal and each of the unique words. The specific unique word correlator is selected so that the selected correlator provides the maximum correlation value among the correlators higher than a predetermined threshold value. A TDM frame timing is determined to the unique word correlator which provides said maximum correlation value, so that it is shortened to establish frame synchronization in a slave station.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 7:
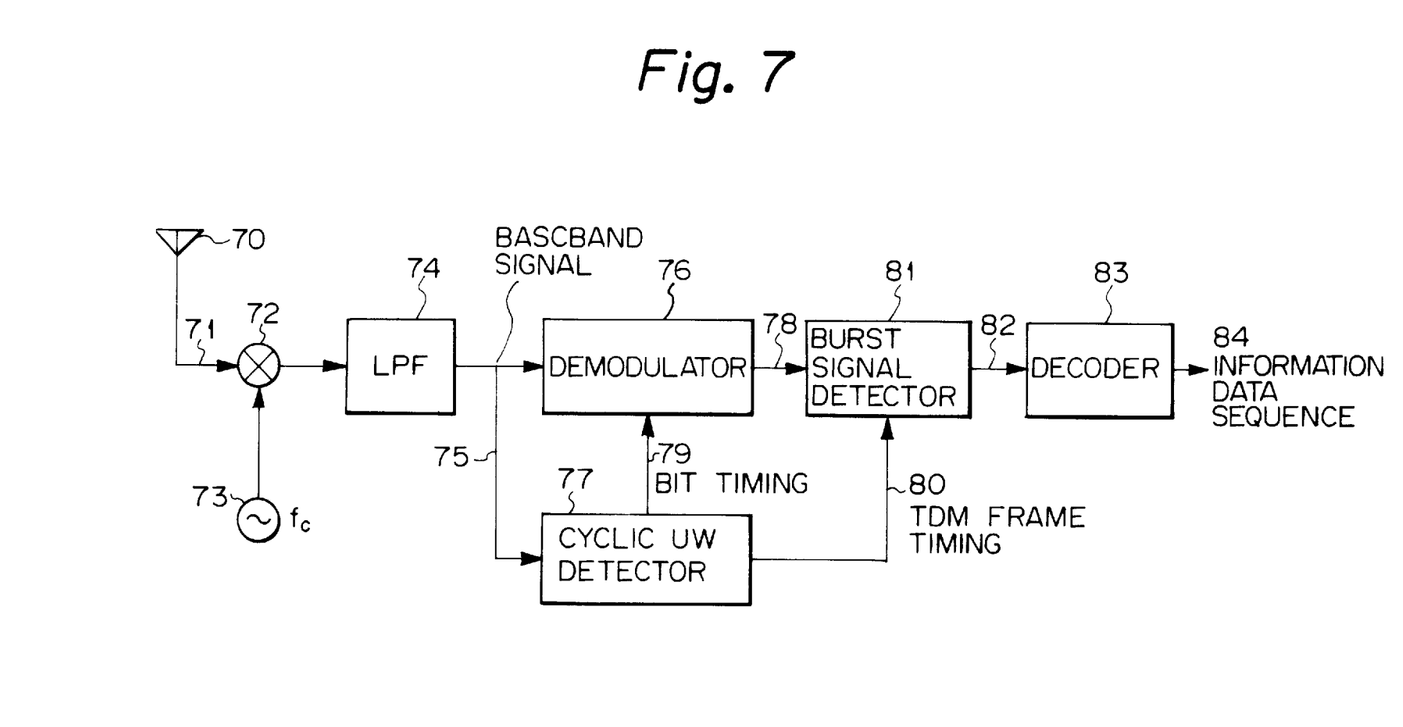
FIG. 7 shows a block diagram of a receiver which uses the present unique word recognition system.

FIG. 7 shows a block diagram of a receiving station to which the present invention is applied. A TDM signal transmitted by a master station (not shown) is received by a receiving station or a slave station of FIG. 7, through an antenna 70. An output of the antenna 70 is applied to a frequency mixer or a multiplier 72 which also receives local frequency $f_c$ from a local oscillator 73. An output of the multiplier 72 is applied to a low pass filter 74, which provides baseband signal 75. The baseband signal 75 is applied to a demodulator 76 and a cyclic unique word detector 77.

The cyclic unique word detector 77 detects a unique word in receive TDM signal, and provides a frame timing signal 80 of a TDM signal, and a bit timing signal 79 of a data signal.

The demodulator 76 demodulates a baseband signal 75 so that a received data signal 78 is output by sampling the baseband signal at the optimum sampling point by using the bit timing signal 79.

The received data signal 78 is applied to a burst signal detector 81 which receives a TDM frame timing signal 80 from the cyclic unique word detector 77 so that a TDM frame signal 82 is provided. The TDM frame signal 82 is applied to a decoder 83, which provides information data sequence 84.

In a receiver thus described, the present invention concerns means for providing a TDM frame timing signal 80 in a cyclic unique word detector 77.

Figure 1:
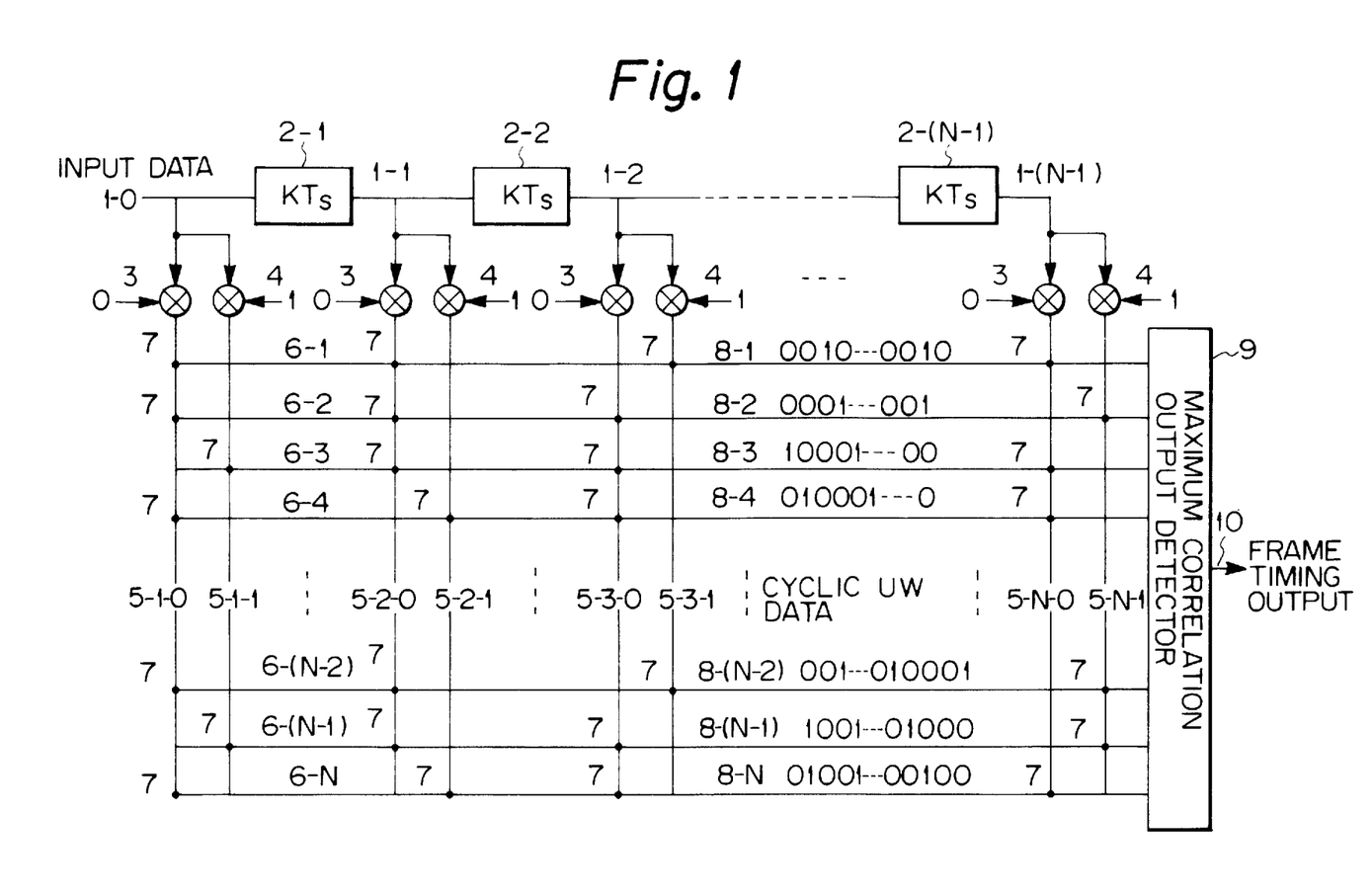
FIG. 1 is a block diagram of a correlator of cyclic type according to the present invention.

FIG. 1 shows a block diagram of a cyclic unique word correlator according to the present invention. It shows the case of hard detection for the sake of simplicity, but of course soft detection is possible to those skilled in the art.

The cyclic unique word correlator in FIG. 1 has N pairs of multipliers 3 and 4 (where N is number of symbols in a unique word, and is for instance N=64), each relating to symbol 0 and symbol 1 of hard detection, N pairs of output lines (5-1-0 and 5-1-1, through 5-N-0 and 5-N-1) of the multipliers 3 and 4, (N−1) number of symbol delays $KT_s$ (2-1 through 2-(N−1)), where K is symbol period of transmission of a unique word, and N number of lines (6-1 through 6-N) each relating to each unique word UW shifted by one symbol with one another. N number of correlation values between a received unique word and N number of correlators are obtained by coupling the N number of lines with a multiplier 3 or 4 according to a pattern of a unique word.

A cyclic unique word correlator operates, to provide N number of correlation values between a received word and N number of unique words 8-1 through 8-N which are obtained by shifting a unique word one symbol by one cyclically, and does not operates based upon a fixed unique word having N symbols. In the example, the numeral 8-1 is a first unique word having the pattern "0010- - - 0010". The second unique word 8-2 is "0001- - - 001" which is obtained by shifting a symbol of the first unique word 8-1 by one symbol in a left direction and the most left symbol "0" in the pattern 8-1 is inserted in the most right position in the pattern 8-2. Other unique words 8-3 through 8-N are obtained similarly by shifting a preceding unique word pattern by one symbol cyclically.

In FIG. 1, a multiplier 3 (and output lines 5-1-0 through 5-N-0) relates to a symbol "0", and a multiplier 4 (and output lines 5-1-1 through 5-N-1) relates to a symbol "1". In the first unique word 8-1, the first three symbols are 001, and therefore, the line 6-1 is coupled with the first output line 5-1-0 (first symbol is 0). The second output line 5-2-0 (second symbol is 0), and the third output line 5-3-1 (third symbol is 1). Similarly, output lines 6-i (i is 1 through N) is coupled with either output line 5-i-0 or 5-i-l, according to each symbol (0 or 1).

Each correlator, or output line 6-1 through 6-N, provides correlation value to the maximum correlation output detector 9. The correlation value in the example of FIG. 1 is the sum of the same symbols in comparison of the received signal in each symbol with each corresponding symbol in a unique word pattern 8-i. When a symbol in a received signal coincides with a corresponding symbol in a unique word pattern, a multiplier 3 (when a symbol is 0) or 4 (when a symbol is 1) provides output "1". When all the symbols in a received signal coincide with the related symbols in a unique word, the correlation value is the same as the number of symbols in a unique word pattern. And, each unique word pattern 8-1 through 8-N relates to the specific frame timing. The sum in the correlation value may be the sum of the level of the outputs (0 or 1) of the multipliers 3 and 4, alternatively, the sum may be the counted value in the correlators 6-i for counting the number of the output "1" of the multipliers 3 and 4.

Among the correlation values which exceed a predetermined threshold value, the maximum correlation value is selected by the maximum correlation output detector 9, which provides the frame timing information 10 according to the unique word pattern which provides said maximum correlation value. Thus, the frame synchronization of a TDM signal is established in a short time. In an actual apparatus, a differential decoding is effected to a received signal because of a phase slip in receiving a TDM frame signal.

In a cyclic unique word correlator in FIG. 1, a received unique word is applied to a series of delay circuits 2-1 through 2-(N-1), repetitively, since a unique word is included in each frame in a receive signal. When one of the unique word pattern 8-1 through 8-N coincides with a received data, the maximum correlation value P (normalized correlation value is 1) is obtained, and the outputs of other output lines are P/2 (normalized correlation value is 0.5), depending upon a pattern of a unique word. Preferably, a unique word is selected so that a correlation value when a received signal does not coincides with a unique word is far less than that in coincide condition. When it is recognized which unique word pattern (8-1 through 8-N) provides the maximum correlation value, it is recognized which portion of a TDM frame is received, since each unique word pattern corresponds to a specific frame timing, and a frame synchronization is established.

Figure 5:
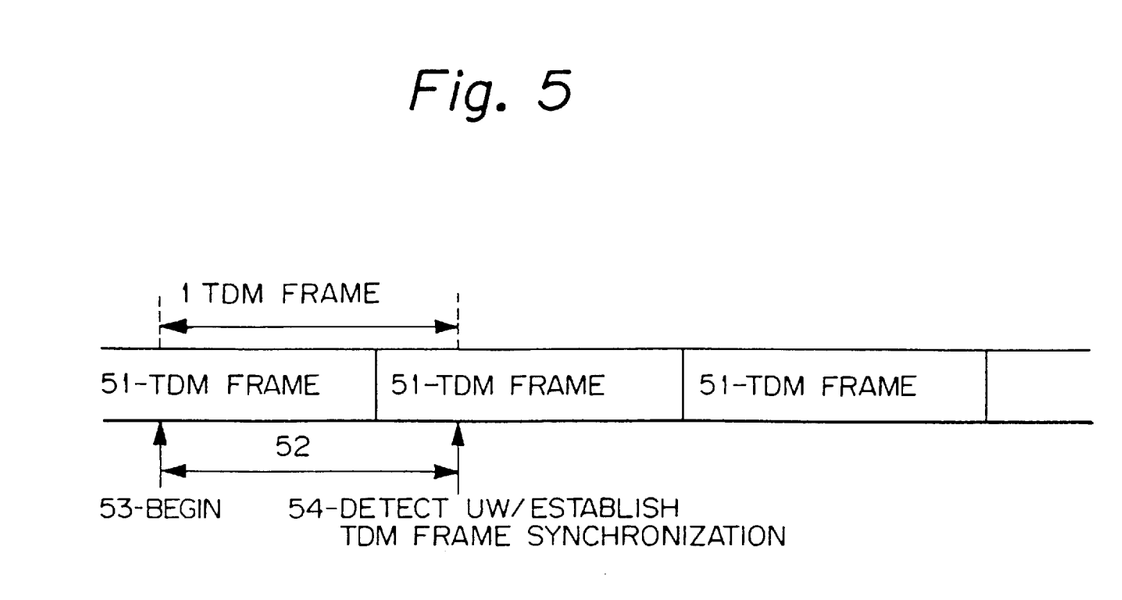
FIG. 5 shows explanation to establish synchronization according to the present invention.

That is explained in accordance with FIG. 5. Assuming that a slave station is switched ON and begins reception at time 53, the frame synchronization with the TDM signal from a master station is established at time 54 which is after one TDM frame duration from the beginning time 53.

Even when only a part of a frame is received, or number of received symbols is less than those of one frame symbols because of noise, the present cyclic unique word correlator may recognize a unique word, by assuming unreceived portion a random symbol 0 or 1, if a decrease in reliability in recognizing a unique word is allowed. This means that the present invention may establish frame synchronization in further shorter time.

In a current commercial Inmalsat C system, it is possible to establish frame synchronization with NCS in 8.64 second, and a frame synchronization with LES is established in the following 8.64 second. Therefore, the total time for synchronization is less than 20 seconds. That means that the time for starting communication is only one third as compared with that of a prior art.

Figure 6:
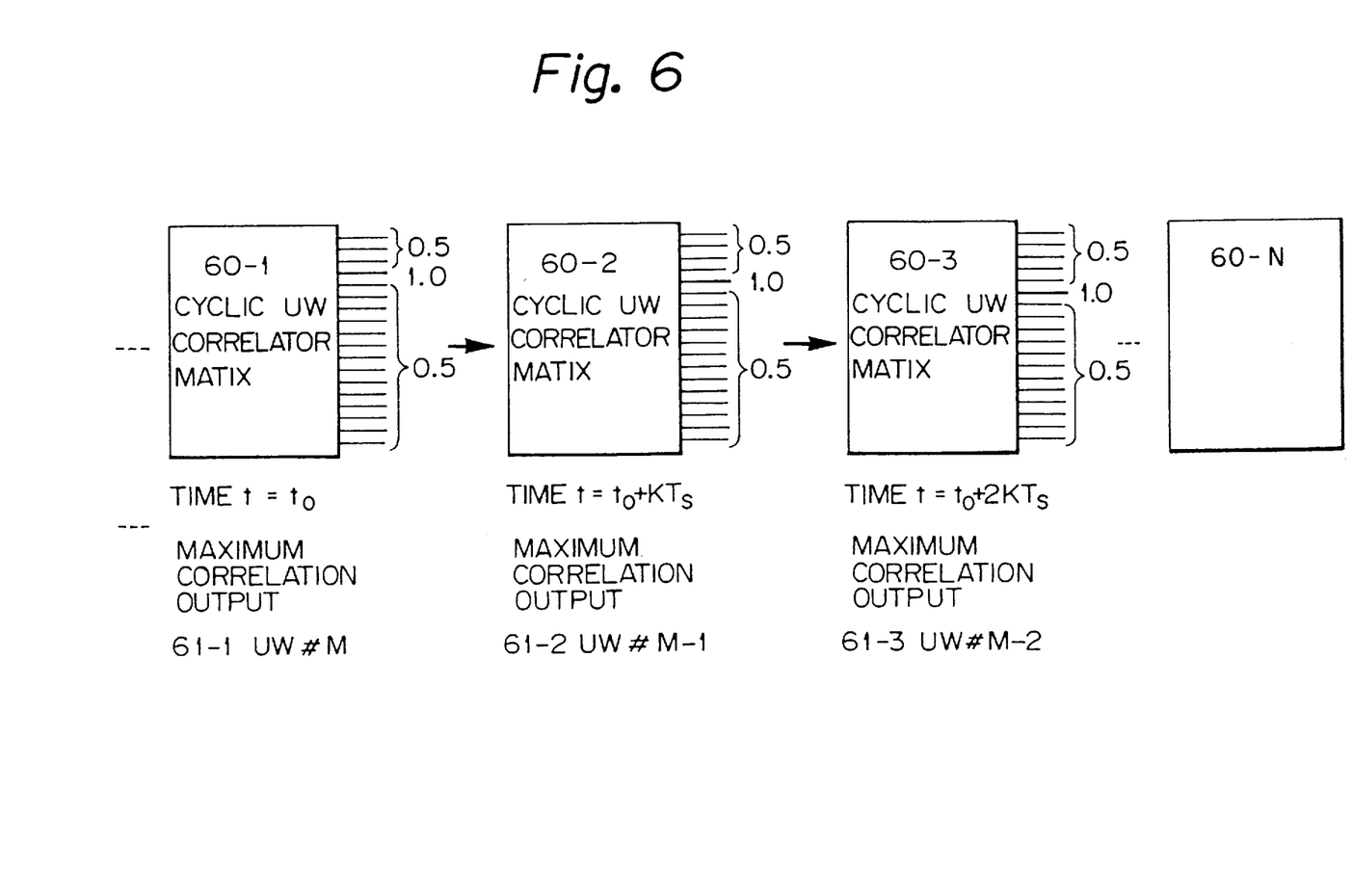
FIG. 6 shows embodiment to recognize a unique word and establish synchronization according to the present invention.

Next, the modification of the present unique word recognition system is explained in accordance with FIG. 6. In FIG. 6, cyclic unique word correlator matrixes 60-1, through 60-N show an output status of correlation at time $t=t_0$, $t_0+KT_s$, $t_0+2KT_s$,,,, $t_0+(L-1)KT_s$, respectively.

The matrix 60-1 provides the maximum correlation output 1 for the M'th unique word, and 0.5 for other unique words, therefore, it is recognized provisionally that M'th unique word pattern is received at time $t_0$.

Next matrix 60-2 provides the maximum correlation output 1 for the (M+1)'th unique word at time $t_0+KT_s$, and 0.5 for other unique words, therefore, it is assumed provisionally that (M+1l)'th unique word pattern is received at time $t_0+KT_s$.

Similarly, the output of each matrix is measured to confirm that the unique word pattern which provides the maximum correlation value is shifted one by one in every $KT_s$ second during a plurality of symbol durations of a unique word pattern.

The modification of FIG. 6 has the advantage that a unique word detection and a frame synchronization are improved, since a plurality of unique words are recognized, and it is confirmed that a unique word which provides the maximum correlation value shifts one by one.

The modification of FIG. 6 may be mixed with that of FIG. 1, so that the operation begins at the beginning of a receive signal at a slave station. A number of symbols to monitor transition of the maximum correlation value for improving operational reliability may be 3 in practical use.

The specific effects of the present invention are as follows.

1) The present invention shortens the necessary time for synchronization considerably as compared with a prior art from the beginning of reception of a TDM signal in a slave station to the beginning of actual communication.

2) A TDM frame synchronization is established in a short time with high accuracy by measuring cyclic unique word correlator outputs continuously.

3) An excellent communication service with small power consumption and excellent efficiency is obtained by applying the present invention to a handheld type portable terminal.

From the foregoing it will now be apparent that a new and improved unique word recognition system has been found. It should be understood of course that the embodiments disclosed are merely illustrative and are not intended to limit the scope of the invention. Reference should be made to the appended claims therefore for indicating the scope of the invention.

What is claimed is:

1. A unique word recognition system in a radio communication system including a plurality of slave stations and a master station for communication with said slave stations, comprising:

said master station broadcasting a control signal to said slave stations through time division multiplex (TDM) signal through downward circuits from the master station to the slave stations, said time division multiplex signal having a frame which has a plurality of slots, each slot having a plurality of binary symbols, said frame including a unique word which is interleaved in said slots so that a part of said unique word is included in each slot, each slave station receiving said control signal from said master station synchronized with said TDM signal, and initiating communication between the slave station and the master station based upon said control signal, each slave station having a cyclic detector including a plurality of unique word correlators each having a specific unique word pattern, and each unique word correlator defining TDM frame timing for frame synchronization between said master station and said slave station, said cyclic detector including N pairs of multipliers, each relating to one of symbol 0 and symbol 1, N pair of output lines of the pair of multipliers, N−1 number of symbol delays, N number of lines each relating to each unique word shifted by one symbol relative to one another, said N number of lines coupled to N pair of output lines of the pair of multipliers according to a pattern of a unique word and a maximum correlator output detector connected to the N number of lines, where N is a number of symbols in a unique word, said unique word pattern in each unique word correlator being obtained by shifting a reference unique word pattern by predetermined symbols cyclically, the number of said unique word correlators in each slave station being the same as the number of symbols in a unique word, each of said unique word correlators providing a correlation output value between a received frame signal and each of said unique words, a specific unique word correlator being selected so that the selected correlator provides the maximum correlation value among the correlators higher than a predetermined threshold value, wherein a TDM frame timing is determined according to the unique word correlator which provides said maximum correlation value, so that time necessary to establish frame synchronization in a slave station is shortened.

2. A unique word recognition system according to claim 1, wherein said TDM frame timing for frame synchronization is determined by testing said plurality of unique word correlators to recognize that the specific unique word correlator which provides the maximum correlation value shifts one by one.

3. A unique word recognition system according to claim 2, wherein at least three unique word correlators are tested.

4. A unique word recognition system according to claim 1, wherein said TDM frame has 64 slots, and each slot has 162 symbols with two unique word symbols and 160 data symbols.

5. A unique word recognition system according to claim 1, wherein said unique word pattern in each unique word correlator is obtained by shifting a unique word pattern in a preceding unique word correlator by one symbol cyclically.

6. A unique word recognition system in a radio communication system including a plurality of slave stations and a master station for communication with said slave stations, comprising:

said master station broadcasting a control signal to said slave stations through time division multiplex (TDM) signal through downward circuits from the master station to the slave stations, said time division multiplex signal having a frame which has a plurality of slots, each slot having a plurality of binary symbols, said frame including a unique word which is interleaved in said slots so that a part of said unique word is included in each slot, each slave station receiving said control signal from said master station synchronized with said TDM signal, and initiating communication between the slave station and the master station based upon said control signal, each slave station including a cyclic unique word detector, the cyclic unique word detector including a series of delay circuits, a plurality of pairs of multipliers, a plurality of unique word correlators and a maximum level detector, said plurality of unique word correlators each having a specific unique word pattern, and each unique word correlator defining TDM frame timing for frame synchronization between said master station and said slave station, said unique word pattern in each unique word correlator being obtained by shifting a reference unique word pattern by predetermined symbols cyclically, the number of said unique word correlators in each slave station being the same as the number of symbols in a unique word, each of said unique word correlators providing a correlation output value between a received frame signal and each said unique words, a specific unique word correlator being selected so that the selected correlator provides the maximum correlation value among the correlators higher than a predetermined threshold value, wherein a TDM frame timing is determined according to the unique word correlator which provides said maximum correlation value, so that time necessary to establish frame synchronization in a slave station is shortened.

7. A unique word recognition system in a radio communication system including a plurality of slave stations and a master station for communication with said slave stations, comprising:

each slave station including a cyclic unique word detector, the cyclic unique word detector including a series of delay circuits, a plurality of pairs of multipliers, a plurality of unique word correlators and a maximum level detector, said plurality of unique word correlators each having a specific unique word pattern, and each unique word correlator defining TDM frame timing for frame synchronization between said master station and said slave station, said unique word pattern in each unique word correlator being obtained by shifting a reference unique word pattern by predetermined symbols cyclically, the number of said unique word correlators in each slave station being the same as the number of symbols in a unique word, each of said unique word correlators providing a correlation output value between a received frame signal and each of said unique words, a specific unique word correlator being selected so that the selected correlator provides the maximum correlation value among the correlators higher than a predetermined threshold value, wherein a TDM frame timing is determined according to the unique word correlator which provides said maximum correlation value, so that time necessary to establish frame synchronization in a slave station is shortened.

\* \* \* \* \*